Patented Apr. 21, 1936

2,037,791

UNITED STATES PATENT OFFICE 2,037,791

TREATMENT OF HYDROCARBON OILS

Vladimir Ipatieff, Chicago, Ill., assignor to Universal Oil Products Company, Chicago, Ill., a corporation of Delaware No Drawing. Application June 30, 1933,
Serial No. 678,474

11 Claims. (Cl. 196—24)

This invention relates particularly to the treatment of the lower boiling distillates produced by cracking heavier hydrocarbon oil mixtures though the process is also applicable to the treatment of similar distillates produced in the straight run distillation of petroleum and other hydrocarbon materials.

In a more specific sense the invention has reference to a process for desulphurizing hydrocarbon motor fuel fractions or naphthas containing a substantial percentage of the same by employing novel catalysts and conditions of operation which have been found to be especially effective in removing the sulphur. While the reduction of sulphur constitutes the outstanding feature of the process, other beneficial treating effects are obtained by the reactions of the treatment which add value to the process, these special advantages being referred to in the following specification describing the major features of the invention.

Sulphur compounds of different types exist in varying percentages in all petroleum distillates, and are present in unusually large amounts in the pressure distillates resulting from the pyrolysis of sulphur-containing oils. The form of combination of the sulphur in the distillates varies, some hydrogen sulphide being present along with mercaptans, sulphur ethers, thiophenes, etc., the ease of removal of these compounds by different methods of treatment decreasing generally in order named. The sulphur contained in heterocyclic ring compounds of the thiophene type is particularly resistant to treating influences, and is ordinarily lost only on severe treatment such as that involving the use of excessive amounts of strong sulphuric acid or high pressure hydrogenation with excess of hydrogen and active catalysts. Inasmuch as present day motor fuel specifications still require a sulphur content of less than 0.1%, the removal of sulphur down to this point from gasolines produced by cracking sulphur-containing oils is a problem of major importance and various investigators in this field have sought to devise special and selective treatments for removing the requisite amount of sulphur without incurring large losses of material, particularly hydrocarbons of high anti-knock value. The use of sulphuric acid for removal of sulphur is in many cases highly destructive of hydrocarbon material and many substitutes have been offered therefor among which may be mentioned limited hydrogenation in the presence of selected catalysts. It is with improvements in processes of the last named character that the present invention is specially concerned.

In one specific embodiment the invention comprises treatment of sulphur-containing hydrocarbon oil distillates, particularly vapors of cracked distillates of motor fuel boiling range, with hydrogen-containing gases in the presence of catalysts comprising metal oxides, thiomolybdates and aluminates.

In a further specific embodiment the invention comprises the use of catalysts comprising metal thiomolybdates and aluminates for the same purpose.

I have found that composite catalysts of the character stated in which the proportions of the three essential components are varied within certain limits are of special effectiveness in influencing the course and speed of hydrogenation reactions which act to desulphurize cracked vapors. By varying the composition of the mixtures, using different metal oxides, metal thiomolybdates and aluminates (which will all be described in greater detail in succeeding paragraphs) in proportions which have special value in particular cases, it is possible to prepare a large number of catalyst mixtures which are utilizable according to the present process. Each of such alternative catalyst mixtures, however, will exert its own specific action which is in no sense exactly equivalent to the action of others of the same general character.

A number of metal oxides may be employed in the catalyst mixtures, among which may be mentioned the oxides of iron, nickel and cobalt, aluminum, zinc, cadmium, vanadium, thorium and others. These may be employed singly or in various combinations and the proportion of them in the catalyst mixture may be varied within any desired limits up to approximately 25% by weight. Depending upon the method of preparation of the catalyst mixture, that is, whether it is prepared by methods of dry fusion or wet precipitation, there may be a certain amount of interchange of bases in the mass so that some of the original oxide is present in the catalyst mixture in combined form.

The use of metal oxides in the catalyst mixtures is in a general way determined by the percentage of sulphur and the difficulty of its removal. Metal oxides have a greater tendency to combine with sulphur compounds under hydrogenating influences than thiomolybdates and owing to this tendency less extensive hydrogenation is sometimes necessary so that there is less concurrent saturation of olefines with corresponding loss in anti-knock value. The presence or absence of oxides in the catalyst mixtures will be determined by the characteristics of the stock to be desulphurized.

The salts of thiomolybdic acid (particularly the heavy metal salts) when employed as catalysts in hydrogenating reactions having for their principal object the desulphurization of cracked oils, are unusually resistant to sulphur contamination so that their life under any given set of operating conditions is longer than that of many other catalysts employed for a similar purpose. At this point it may be well to recount some of the compounds in this class which may be used as components of the present type of catalyst mixture.

The thiomolybdates may be considered generally as molybdates in which the oxygen in the acid radical is partially or completely replaced by sulphur. Such compounds may be represented by the formulas $R_2'MoS_4$, $R_2'Mo_2S_7$, and $R_2'Mo_3S_{10}$ when the oxygen is completely replaced by the sulphur and by generally similar formulas in which only part of the oxygen has been thus replaced, $R'$ representing any monovalent base. By proper balancing of basic and acid radicals other bases having different valences may be substituted for $R'$.

Soluble thiomolybdates are prepared by the action of hydrogen sulphide on solutions of molybdates or by the action of soluble sulphides on molybdenum trisulphide. Insoluble thiomolybdates may be formed by adding a solution of an alkali or alkaline earth thiomolybdate to a solution of a metal salt, or vice versa. For example, a cobalt thiomolybdate may be precipitated when a solution of cobalt nitrate is added to a solution of ammonium molybdate.

Thiomolybdates of the following metals are known: those of the alkali metals and ammonium, copper, silver, gold, barium, strontium, calcium, magnesium, beryllium, zinc, cadmium, mercury (both mercurous and mercuric), tin (both stannous and stannic), lead, chromium, manganese, iron (both ferrous and ferric), cobalt, nickel and platinum. The majority of the compounds of the metals enumerated are readily prepared by precipitation methods. In such cases the precipitates may consist of simple salts or compound salts produced by using precipitating solutions containing more than one base.

As in the case of the metal oxides which constitute one of the groups which may be employed according to the present invention, the different thiomolybdates may also be alternated, without, however, producing exactly equivalent results.

Various aluminates may also be used in forming the composite catalyst mixtures such as, for example, the aluminates of the alkali metals, particularly sodium and potassium and also the aluminates of the alkaline earth metals and the aluminate of zinc. Sodium aluminate is employed very successfully and a description of its preparation will give a general idea of the methods of formation and the properties of aluminates in general.

In making sodium aluminate which may be designated by the formulas $Al_2O_3.3Na_2O$ or $Al_2(NaO)_6$, one method consists in passing a current of steam through a heated mixture of bauxite and common salt and another method consists in strongly heating a mixture of bauxite, sodium sulphate and carbon. In the latter case some difficulty may be encountered in purifying the mass from sodium sulphide simultaneously produced. Still another method consists in heating powdered cryolite to redness with chalk, forming sodium aluminate and calcium fluoride according to the following equation:

$$Al_2F_6.6NaF + 6CaCO_3 = Al_2(NaO)_6 + 6CaF_2 + 6CO_2.$$

The mass produced is lixiviated with water and filtered. The filtrate contains the sodium aluminate in solution and the solution may be used as such or may be concentrated or diluted to any desired point for use in making up the various catalysts which are used in desulphurizing oils according to the present process.

Sodium aluminate is a white, infusible, amorphous solid, which is readily soluble in both cold and hot water. The corresponding compound of potassium is quite similar as are also the alkaline earth aluminates. The aluminate of zinc is characterized by a lower solubility than the aluminates of the alkali and alkaline earth metals.

Catalysts of the present character comprising metal oxides, thiomolybdates and aluminates may be prepared by any convenient method which may be suggested to those generally familiar with chemical processes, and particularly with the art of catalyst preparation. In one method of preparation a solution of an alkali or ammonium thiomolybdate and an aluminate may be treated with a soluble heavy metal salt in proper concentration so that a precipitate containing oxide, thiomolybdate and aluminate is produced. The density and other characteristics of the precipitate can be varied by suitably choosing the conditions of precipitation. The precipitate may then be washed, and if desired or necessary receive further additions of any of the three essential ingredients before drying to bring it to a condition suitable for use. For example, a more or less gelatinous precipitate may receive further additions of a metal oxide or a solid thiomolybdate by straight mechanical admixture. As a rule the aluminate in the catalyst will be adsorbed or occluded in sufficient amount during the formation of the precipitate.

Catalyst mixtures may also be prepared by methods of dry fusion or by mixing without fluxing. In such cases the essential ingredients in the chosen proportions are mixed by mechanical means and the mass dried or further calcined until the desired chemical and physical condition is attained.

To prepare catalyst mixtures substantially free from oxides, which is contemplated as an alternative, it is only necessary to control the quantity of metal salt precipitant used in the wet method of catalyst preparation or to properly proportion the ingredients subjected to dry fusion.

In conducting desulphurizing operations upon cracked vapors when catalysts of the present character are employed only simple and readily procurable equipment is necessary, the prepared catalyst being disposed as filler in vertical or horizontal tubes or treating chambers properly designed with respect to the ratio of cross section to length so that the vapors to be treated, mixed with hydrogen or hydrogen-containing gases may be passed therethrough at economic space velocities without undesirably large pressure drops. In some instances the catalysts may be distributed in thin layers upon regularly spaced trays so that the vapors plus hydrogen do not pass through the entire mass of catalysts but merely contact the surface of the same. The use of relatively inert fillers or spacing agents along with the preferred catalysts is included in the present process though obviously this constitutes no special feature thereof since it is of long standing in the art with which the present invention is concerned.

The amount of hydrogen necessary for mixing with the vapors will depend to some extent upon the character and amount of the sulphur compounds but will usually not exceed 10 to 15% by volume of the vapors as such. The hydrogen needed will also vary with the efficiency of the catalyst mixture employed which in turn will depend upon its primary inherent characteristics and upon the time that it has been in service. This point will be readily determined by trial in the case of any given distillate which is to be desulphurized.

As an example of results obtainable by the use of the process those obtained when treating a California gasoline produced from the final fractionator of a cracking plant may be considered. These vapors are produced under a pressure of approximately 225 pounds per square inch at a temperature of 450° F. Prior to passage through the catalyst they may be superheated to a temperature of approximately 575° F. The catalyst, prepared by the dry fusion of molecular proportions of ferric sulphide ($FeS_2$), molybdic sulphide ($MoS_3$) and nickel oxide (NiO), may comprise essentially 65% by weight of ferric thiomolybdate, 10% of nickel oxide, 10% of sodium aluminate and 15% of infusorial earth as an inert spacing or distributing carrier. The amount of hydrogen used is approximately 5% of the total vapor mixture passing over the catalyst. The following tabulation of comparative data shows the properties of the gasoline before and after treatment in the manner described:

*Comparison of untreated and treated gasolines*

|  | Untreated | Treated |
|---|---|---|
| Gravity, ° A. P. I. | 54.5 | 54.9 |
| End point ° F | 410 | 405 |
| Color, Saybolt | 22 | +30 |
| Mg. gum by copper dish | 225 | 15 |
| Total sulphur percent | 0.32 | 0.09 |
| Octane number | 75 | 74 |

The advantages of the process are evident from a consideration of the above data, which shows an improvement in all respects. The yield of treated gasoline was 99%. The slight loss in octane number was due to saturation of the more highly unsaturated olefinic constituents of the gasoline but this loss is more than compensated for by the decrease in sulphur and gum content and the increase in color and color stability under storage conditions.

As another example of results obtainable by the use of the process those obtained when treating a different sample of California cracked gasoline may be considered. The vapors of this gasoline are produced under a pressure of approximately 250 pounds per square inch at a temperature of 470° F. Prior to passage through the catalyst they may be superheated to a temperature of approximately 600° F., and receive an addition of approximately 5% hydrogen by volume of the vapors. The catalyst, prepared by the general methods previously outlined, may comprise 75% by weight of nickel thiomolybdate, 10% of sodium aluminate and 15% of infusorial earth as an inert spacing or distributing carrier. The following tabulation of comparative data shows the properties of the gasoline before and after treatment in the manner described:

*Comparison of untreated and treated gasolines*

|  | Untreated | Treated |
|---|---|---|
| Gravity, ° A. P. I. | 53 | 53.4 |
| End point ° F | 405 | 400 |
| Color, Saybolt | 20 | +30 |
| Mg. gum by copper dish | 250 | 15 |
| Total sulphur, percent | 0.34 | 0.08 |
| Octane number | 76 | 76 |

The advantages of the process are further evident from the above data, which show a general improvement in properties. The yield of gasoline was 98.9% and it is worthy of special note that the octane number was not affected by the treatment in spite of the hydrogenation which effected a considerable reduction in the sulphur content. This point appears to be characteristic of the catalyst used in this case.

The results obtained in treating a gasoline produced by cracking Mid-Continent gas oil may also be cited. The pressure distillate produced from the primary cracking plant at a temperature of 940° F., and a pressure of 300 pounds per square inch may be revaporized to the extent of approximately 90%, the vapors mixed with 5% of hydrogen by volume preheated to about 575° F., and passed over the catalyst under a pressure of about 100 pounds per square inch. The catalyst prepared by the general method previously outlined may comprise 90% cobalt thiomolybdate and 10% sodium aluminate. The following tabulation of comparative data shows in column 1 the properties of the gasoline producible from the untreated pressure distillate by simple fractionation to the end point shown while the corresponding figures in column 2 show the properties after the desulphurizing treatment.

*Comparison of untreated and treated gasolines*

|  | Untreated | Treated |
|---|---|---|
| Gravity, ° A. P. I. | 54 | 54.4 |
| End point, ° F | 405 | 402 |
| Color, Saybolt | 18 | 30 |
| Mg. of gum by copper dish | 225 | 15 |
| Total sulphur, percent | 0.30 | 0.10 |
| Octane number | 75 | 74 |

The yield of desulphurized gasoline was 98.5 to 99% of the yield which could be obtained by simple fractionation without treatment and the change in properties is characteristic of the results obtainable with this type of catalyst when operating under suitably chosen conditions.

While the foregoing specification and the numerical data given are sufficient to indicate the advantages of the use of the process of the invention, neither is to be construed as impossing limitations upon the scope of the invention.

I claim as my invention:

1. A process for the treatment of cracked hydrocarbon oil of substantially motor fuel boiling range to reduce the sulphur content thereof and to remove objectionable sulphur compounds which comprises, subjecting the hydrocarbon oil to the action of hydrogen-containing gas in the presence of a catalyst comprising an aluminate and a thiomolybdate under temperature and pressure conditions adequate to react the hydrogen with sulphur compounds contained in the oil.

2. A process for the treatment of hydrocarbon oil to reduce the sulphur content thereof and to remove objectionable sulphur compounds which comprises, subjecting the hydrocarbon oil to the action of hydrogen-containing gas in the presence of a catalyst comprising a thiomolybdate of a metal and an aluminate, under temperature and pressure conditions adequate to react the hydrogen with sulphur compounds contained in the oil.

3. A process for the treatment of hydrocarbon oil to reduce the sulphur content thereof and to remove objectionable sulphur compounds which comprises, subjecting the hydrocarbon oil to the action of hydrogen-containing gas in the presence of a catalyst comprising a mixture containing a metal oxide, a thiomolybdate of a metal, and an aluminate, under temperature and pressure conditions adequate to react the hydrogen with sulphur compounds contained in the oil.

4. A process for the treatment of cracked hydrocarbon oil of substantially motor fuel boiling range distillate to reduce the sulphur content thereof and to remove objectionable sulphur compounds which comprises, subjecting the hydrocarbon oil while in heated vaporous condition to the action of cracked hydrogen containing gas in the presence of a catalyst comprising an aluminate, a metal oxide and a thiomolybdate, under temperature and pressure conditions adequate to react the hydrogen with sulphur compounds contained in the oil.

5. A process for the treatment of hydrocarbon oil distillate to reduce the sulphur content thereof and to remove objectionable sulphur compounds which comprises, subjecting the hydrocarbon oil while in heated vaporous condition to the action of hydrogen containing gas in the presence of a catalyst comprising a thiomolybdate of a metal and an aluminate, under temperature and pressure conditions adequate to react the hydrogen with sulphur compounds contained in the oil.

6. A process for the treatment of hydrocarbon oil distillate to reduce the sulphur content thereof and to remove objectionable sulphur compounds which comprises, subjecting the hydrocarbon oil while in heated vaporous condition to the action of hydrogen-containing gas in the presence of a catalyst comprising a mixture containing a metal oxide, a thiomolybdate of a metal, and an aluminate, under temperature and pressure conditions adequate to react the hydrogen with sulphur compounds contained in the oil.

7. A process for the treatment of hydrocarbon oil to reduce the sulphur content thereof and to remove objectionable sulphur compounds which comprises, subjecting the hydrocarbon oil to the action of hydrogen-containing gas in the presence of a catalyst comprising nickel oxide, nickel thiomolybdate and sodium aluminate, under temperature and pressure conditions adequate to react the hydrogen with sulphur compounds contained in the oil.

8. A process for the treatment of hydrocarbon oil distillate to reduce the sulphur content thereof and to remove objectionable sulphur compounds which comprises, subjecting the hydrocarbon oil while in heated vaporous condition to the action of hydrogen-containing gas in the presence of a catalyst comprising nickel thiomolybdate and sodium aluminate, under temperature and pressure conditions adequate to react the hydrogen with sulphur compounds contained in the oil.

9. A catalyst for desulphurizing hydrocarbon oils with hydrogen comprising a mixture of a metal oxide, a thiomolybdate, and an aluminate.

10. A catalyst for desulphurizing hydrocarbon oils with hydrogen comprising a mixture of a thiomolybdate and an aluminate.

11. A catalyst for desulphurizing hydrocarbon oils with hydrogen comprising a fused mixture of a metal aluminate and a thiomolybdate.

VLADIMIR IPATIEFF.